(12) United States Patent
Allen et al.

(10) Patent No.: US 6,240,398 B1
(45) Date of Patent: May 29, 2001

(54) PRODUCT CLASSIFICATION PROCESS FOR OPTICAL SUBASSEMBLIES

(75) Inventors: Aristotle B. Allen, Whitehall; Patrick J. Doran, Allentown; Daniel Kern, Sinking Spring, all of PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/226,827

(22) Filed: Jan. 7, 1999

(51) Int. Cl.[7] ........................................ G06F 17/60
(52) U.S. Cl. ................... 705/28; 705/8; 705/10; 700/99
(58) Field of Search .................. 705/28, 8, 22, 705/10; 700/99

(56) References Cited

U.S. PATENT DOCUMENTS

| | | | | |
|---|---|---|---|---|
| 5,101,352 | * | 3/1992 | Rembert | 705/8 |
| 5,596,493 | * | 1/1997 | Tone et al. | 705/10 |
| 5,819,232 | * | 10/1998 | Shipman | 705/8 |
| 5,826,236 | * | 10/1998 | Narimatsu et al. | 705/8 |
| 5,953,707 | * | 9/1999 | Huang et al. | 705/10 |
| 5,963,919 | * | 10/1999 | Brinkley et al. | 705/28 |
| 6,049,742 | * | 4/2000 | Milne et al. | 700/99 |

FOREIGN PATENT DOCUMENTS

8190589A * 7/1996 (JP) ................ G06F/17/60

OTHER PUBLICATIONS

Haverson, Debra Sheer, Management by tyhe book. "Midrange Systems" v. 6, n. 8, (Apr. 27, 1993) p. 44.*

* cited by examiner

*Primary Examiner*—James P. Trammell
*Assistant Examiner*—John Leonard Young
(74) *Attorney, Agent, or Firm*—Darby & Darby

(57) ABSTRACT

A method and system for assigning a classification to a device having a set of qualifying classifications. The method includes the steps of obtaining an inventory count for each classification of device included in the set of qualifying classifications, comparing the inventory count for each such classification to a safety stock number, and assigning a classification to the device from among the classifications which have an inventory count less than the safety stock number. The method enables improved classification assignment with respect to both present demands and future, projected demand thereby more optimally utilizing and distributing inventory. The system may comprise a network of multiple processors which interact with a manufacturing platform

28 Claims, 5 Drawing Sheets

FIG. 3

| | CLASSIFICATION | QUANTITY | PRIORITY |
|---|---|---|---|
| 1) | D-A  ~410 | 10  ~420 | 7  ~430 |
| 2) | D-B | 5 | 5 |
| 3) | D-C | 2 | 1 |

440~ SUBMIT

| OSA | FITS CLASSIFICATION(S) |
|---|---|
| 1 | D-A<br>D-C |
| 2 | D-A<br>D-B |
| 3 | D-A<br>D-B<br>D-C |
| 4 | D-A<br>D-B<br>D-C |

PRODUCT CLASSIFICATION PROCESS FOR OPTICAL SUBASSEMBLIES

FIELD OF THE INVENTION

The present invention relates generally to manufacturing techniques and, more specifically, to a method and system for optimally classifying subassembly components for use in the manufacture of opto-electronic devices.

BACKGROUND OF THE INVENTION

A critical factor in determining whether semiconductor equipment will meet required technical and performance specifications, as well as pricing and manufacturing yields, is the manufacturing process. The more efficient a semiconductor manufacturing process is, the greater the likelihood that such equipment can be delivered on time, at cost and within specification. Because component selection and classification is an important step in the semiconductor manufacturing, process, any improvement in the component selection process will increase manufacturing efficiency.

The growth in optical communications equipment has increased the demand for optical semiconductor devices. Accordingly, optical semiconductor manufacturers have developed manufacturing procedures which minimize both the number of components and the number of steps required in automated manufacture. One automated manufacturing process includes a state-of-the-art packaging and testing (PAT) platform for the manufacture of analog, digital and electro absorptive modulated OSAs. That process utilizes single optical subassemblies (OSAs) each comprising a semiconductor laser, a spherical lens, and a photo detector mounted on a substrate.

An OSA embodies the major functional component of an optical semiconductor device. Each OSA has a set of unique electrical and optical parameters which fit into one or more predetermined classifications. Upon receiving an order for a particular optical semiconductor device, the PAT platform selects a pre-classified OSA which meets or matches the required specifications from the OSA buffer inventory and sends the OSA to the PAT platform. The PAT platform packages the OSA using a gantry-type robotic bonder which is well known in the art, along with other necessary components, into the specified body, which is then hermetically sealed. The result is an optical semiconductor device which meets customer specification.

OSAs are produced in code families, i.e., they are produced in bulk quantities having broad functional homogenous characteristics, e.g., digital, analog, electro absorptive modulated OSAs, etc. But, because the exact electrical and optical specifications of an OSA within the same code family vary during manufacture and, therefore, can not be predetermined, homogenous families of OSAs are produced in heterogeneous mixtures in terms of electrical and optical specifications, e.g., wavelength, voltage/current measurements, etc. Furthermore, collections of OSAs are stored on waffle packs. Efficient operation of a bonding machine requires that these waffle packs contain substantially homogenous OSAs (in term of optical and electrical specifications) when used in packaging specified opto-electronic devices. Thus, it is desirable that OSAs be pre-classified, sorted, and stored in the buffer inventory in "pure packs," i.e., waffle packs of a single, known OSA type.

Often, however, the set of parameters which electrically, optically and physically characterize an OSA may qualify for several different classifications within a particular family of devices. In other words, an OSA, because it meets and operates within a range of electrical and optical characteristics, can be used to make various optical semiconductors devices that match various electrical and optical specifications. Nevertheless, each OSA can be stored as only one pure pack classification in the OSA buffer. Therefore, once a classification is finally selected, that classification governs the use and selection of that type of OSA in a finished optical device.

The manufacture of OSAs is a relatively costly process and it is preferable to avoid holding a large inventory of OSAs for an extended period of time. This is especially true in the case of those OSAs that have a range of optical and electrical specifications, and which are highly desired and yet are rarely produced due to variances and unpredictabilities in the OSA manufacturing process.

Additionally, many manufacturing platforms, including the PAT platform, classify a given OSA in a multiplicity of classifications, up to 300 in number in some families of devices. The efficient, unassisted manual classification of OSAs is time consuming and complex and unlikely to result in a classification which sorts and stores OSAs with regard to both actual and anticipated customer demand, as well as the peculiarities and unpredictability of the optical subassembly manufacturing process, in order to avoid inventory stockpiling.

Accordingly, what is needed in the art and has heretofore been unavailable is an automated classification sorting and storage system for OSAs which accounts for both actual and anticipated customer demand as well as the peculiarities and unpredictability of the optical subassembly manufacturing process in order to avoid inventory stockpiling.

SUMMARY OF THE INVENTION

In accordance with one aspect of the invention, a method for assigning a final classification to a device having parameters which satisfy a set of qualifying classifications includes the steps of obtaining an inventory count for each classification of device included in the set of qualifying classifications, comparing the inventory count for each such classification to a safety stock number, and assigning a final classification to the device from among the classifications which have an inventory count less than the safety stock number. In the preferred embodiment, the inventive method enables subassemblies to be automatically and finally classified with respect to projected or future demands on inventory. That is, the method better ensures that a predetermined minimum stock level is maintained for one or more classifications of devices stored in inventory.

In another aspect of the invention, the comparison and assignment are made with respect to a present demand for product. The method in accordance with that aspect of the invention includes the steps of obtaining an inventory count for each classification of device included in the set of qualifying classifications, comparing the inventory count for each such classification to a present demand, and assigning a final classification to the device from among the classifications which have an inventory count less than the present demand.

In either of these first two aspects of the invention, the final classification is made with respect to at cast one predetermined criterion. However, further criteria can be used.

In a particularly preferred arrangement in accordance with another aspect of the invention, each classification of device has an assigned a restock-priority level, and the final classification assignment step is performed not only with respect to safety stock levels and/or present demand, but with further regard to the restock-priority level of each device classification. The restock-priority level is preferably based on the difficulty of manufacturing an OSA fitting a particular code or classification. Thus, the assigning step in this preferred arrangement may first determine that there is an insufficient quantity in stock of devices that correspond to one or more of the qualifying classifications of the device presently being assigned a final classification, and for those inadequately stocked classifications, the one selected will have the highest priority. Likewise, the restock-priority assignment information can be used to arbitrate between two or more qualifying classifications for which the current inventory is inadequate to satisfy a present demand for product.

A method in accordance with another aspect of the invention includes the steps of obtaining restock-priority assignment data associated with at least the classifications included in a set of qualifying classifications of a given device, and automatically assigning a final classification to that device based on the restock-priority assignment data.

A system in accordance with another aspect of the invention includes means for achieving the steps outlined above, such as a programmed machine.

Another system in accordance with the invention includes a database containing an inventory count of each classification available. A given device having parameters which satisfy a set of qualifying classifications would, therefore, have an inventory count for each such qualifying classification. The system further includes a processor connected to the database which compares the inventory count to a predetermined criterion for each classification included in the set of qualifying classifications. The processor also assigns a final classification to the device from among the classifications which have an inventory count less than the predetermined criterion, and increments the count in the database for the assigned classification. As described above, the predetermined criterion can be a safety stock number to better ensure that future demand is met, or a present demand to account for present demands on inventory. The processor may assign a final classification based on restock-priority data, as described above.

In accordance with a further aspect of the invention, a system for assigning a final classification to a device having parameters which satisfy a set of qualifying classifications comprises a database containing restock-priority assignment data associated with at least the classifications included in the set of qualifying classifications, and a processor in communication with the database which automatically assigns a final classification to the device based on the restock-priority assignment data.

BRIEF DESCRIPTION OF THE DRAWINGS

The forgoing and other aspects of the present invention will be more readily understood from the following Detailed Description and the appended drawings, wherein:

FIG. 3 is an exemplary form that may be used to provide information to the system and method of the invention as shown in FIGS. 1 and 2;

FIG. 5 is a schematic illustration of a portion of another database which includes information used in the system and method of the invention as shown in FIGS. 1 and 2.

DETAILED DESCRIPTION OF A PREFERRED EMBODIMENT

Figure 1:
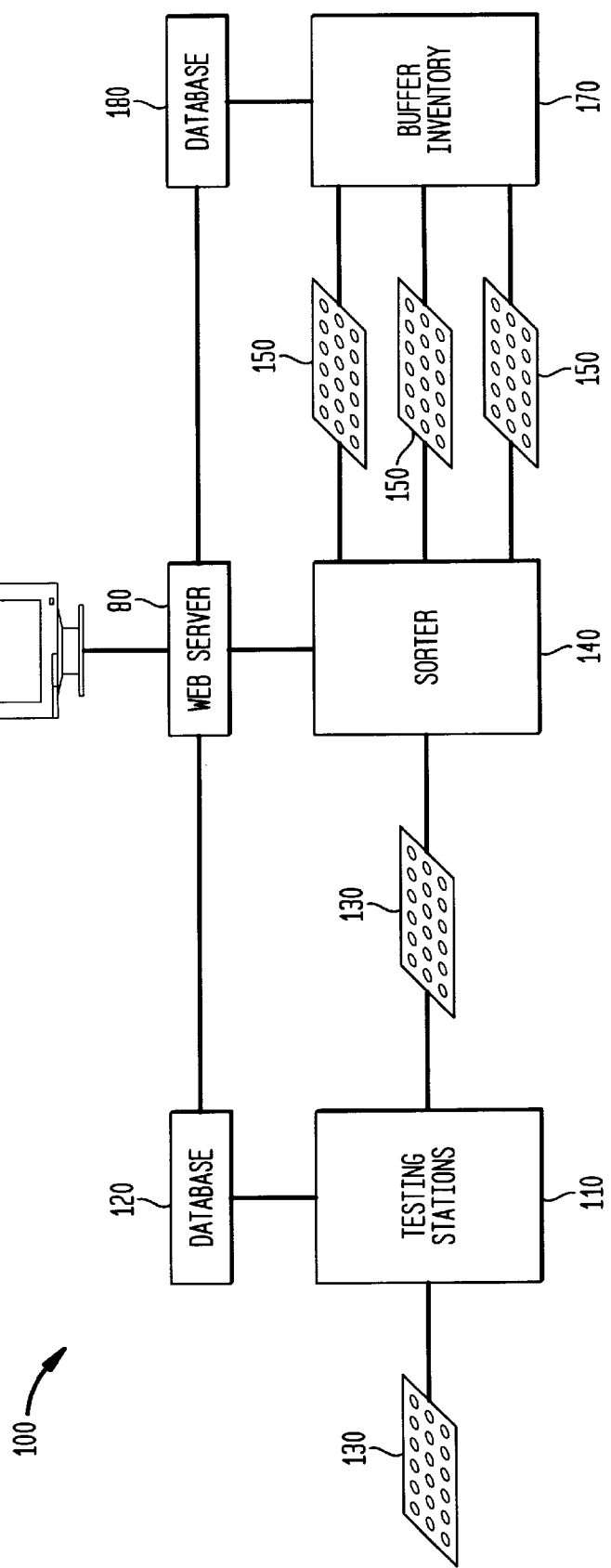
FIG. 1 is a block-system diagram of a system for optimally classifying subassembly components in accordance with a preferred embodiment of the invention.

By way of overview and introduction, a system and method is shown in FIG. 1 which provides dynamic control over the classification or coding and subsequent storage in inventory of optical subassemblies in accordance with a preferred embodiment of the present invention. An Intranet-based WorldWide Web server 80 running on any common server hardware and software platform is programmed to provide a network user terminal 90 with a web-based browser GUI interface. The web server 80 receives data input at the terminal 90 from an inventory specialist or other individual assigned to maintain an inventory of optical subassemblies. From time to time, for each OSA classification, the minimum number of OSAs that are to be in inventory is specified. This minimum number constitutes a "safety stock" for each OSA type. The exact number for each type of OSA may be manually or automatically specified, with reference to a projected demand over a particular (e.g., foreseeable) time period, past demand for certain opto-electronic devices, or a combination of these and other factors. Numerous inventory and/or statistical sampling techniques known in the art may be used to determine the safety stock quantities required for each OSA type. Where a product is only rarely required, a safety stock of "0" may be entered.

In addition, the restock-priority related to each OSA classification may be entered along with the safety stock number. Preferably, the restock-priority is entered as a number on a scale from 1 to 10 with 1 being the highest priority. The order of restock-priority is preferably based on the difficulty of manufacturing an OSA fitting a particular code. The restock-priority and safety stock data are preferably maintained in the server 80.

As noted above, the OSA manufacturing process produces OSAs having sets of parameters (operational voltages, currents, etc.) which satisfy more than one potential classification. As a result, the assignment of a final classification from among a set of qualifying classifications is non-trivial.

For each OSA that satisfies the criteria for multiple classifications, the web server 80 sorts such OSA to determine the optimal classification into which each OSA is to be classified and stored. The sorting routine uses the safety stock, restock-priority data, and perhaps further information to better ensure that the pertinent criteria are optimally satisfied prior to making a determining the final classification for that device.

A waffle pack 130 carrying a predetermined number of newly assembled OSAs travels through the system 100. The OSAs supported by the waffle pack 130 have generally heterogeneous electrical, optical, and operational parameters due to minor variations imparted by the manufacturing process. However, the family to which the opto-electronic devices supported on the waffle pack 130 is known and is homogeneous in character, that is, they are all digital or analog devices.

The system 100 includes a series of testing stations 110 which examine each OSA on the waffle pack 130 and correlate its electrical, optical, physical and/or operational parameters with the products (optical semiconductor devices) that may be constructed 15 with that OSA. Each family of OSAs may be tested in a different manner than other families of devices at the testing stations 110. Upon emerging from testing stations 110, each OSA in the waffle pack 130 is identified by its electrical, optical, physical, and/or operational parameters or specifications. These parameters are correlated to a set of predetermined optical device classifications or codes that the OSA to which the OSA is qualified to be assigned. The multiple qualifying classifications are maintained in a database 120, with the waffle pack 130 now supporting a single family of heterogeneous OSAs. A sorter 140 is then used to separate the heterogeneous packs of OSAs into a series of homogeneous packs 150 with each pack supporting a single type of OSA having a final classification. In particular, the sorter 140 determines, for each OSA that was identified at the testing stations 110 as satisfying multiple classification criteria, the final classification for each such OSA, and then places the OSA into a waffle pack containing only that classification of OSAs. The resulting homogeneous waffle packs are then physically placed into a buffer inventory 170 for storage.

The buffer inventory 170 stores homogenous waffle packs in accordance with their final classification so that a particular classification can be readily retrieved from inventory during the manufacturing process, for example, during the process described in U.S. Pat. Application Serial No. To Be Assigned (Attorney Docket No. 1298/0E929), filed Jan. 7, 1999, for DYNAMIC CONTROL OF OPTICAL SUBASSEMBLIES SELECTION FROM BUFFER INVENTORY, the disclosure of which is hereby incorporated by reference as if set forth in its entirety herein.

In accordance with an aspect of the present invention, the sorter 140 communicates with the web server 80 and a database 180. The database 180 maintains information concerning the state of the buffer inventory 170. The server 80 preferably maintains the safety stock and restock-priority assignment data, although such information can be stored elsewhere, for example, in the inventory database 180.

Figure 2:
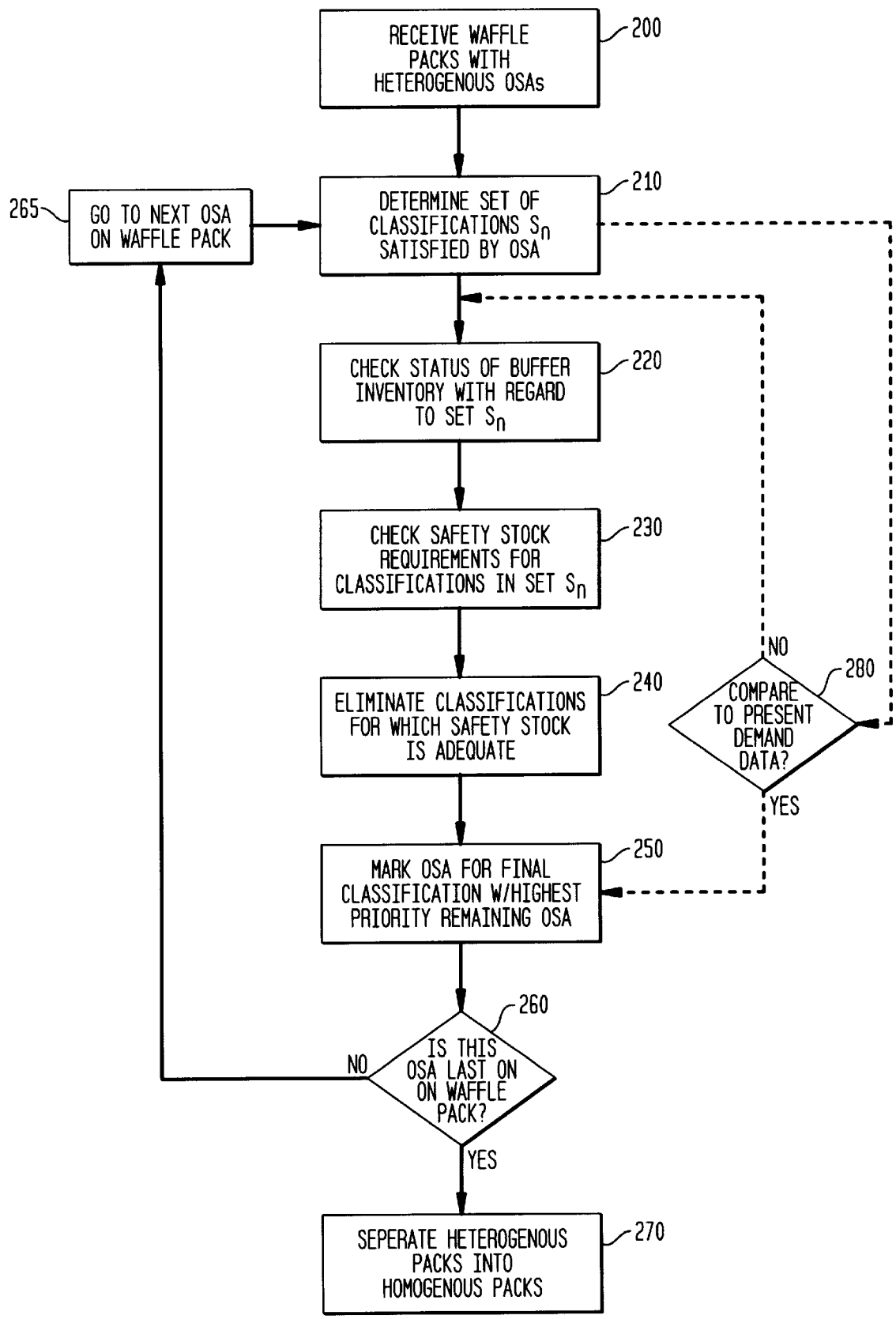
FIG. 2 is a flow diagram of a process for optimally classifying subassembly components in accordance with the preferred embodiment of the invention.

FIG. 2 is a flow chart illustrating a sorting procedure used by the system of FIG. 1 in accordance with the preferred embodiment which intelligently assigns a final classification to the OSAs in a waffle pack. The system essentially monitors the data provided by the testing stations 110 as the contents of the waffle pack 130 are examined, and executes algorithms which guide it in producing homogeneous waffle packs 150.

At step 200 of the flow chart of FIG. 2, a first waffle pack 130 is received and its contents are examined. For each OSA in the waffle pack 130, the database 120 is referenced at step 210 to determine the set of qualifying classifications S (or codes of optical semiconductor devices) which can be manufactured using that OSA. The set of parameters S may be just one classification (or none, if specifications are not met for a given OSA). The particular electrical, optical, physical, and/or operational parameters that were identified at the testing stations 110 for each OSA defines a set of operational specifications which are correlated with one or more classifications to which the OSA can be finally assigned. For a given waffle pack holding up to 50 OSAs (i.e., $OSA_1$ through $OSA_{50}$), for example, there will be $S_1$ through $S_{50}$ sets of qualifying classifications determined at step 210. The set of qualifying classifications S for a given $OSA_n$ is denoted $S_n$.

At step 220, the web server 80 interrogates the inventory database 180 to determine how many OSAs are presently in stock for each of the classifications in the set $S_n$. At step 230, the web server 80 references the safety stock requirements for each classification in the set $S_n$, that is, the minimum number of OSAs to be stored for each classification into which the OSA can be placed.

Each qualifying classification in set $S_n$ for which the safety stock requirements are satisfied by the present buffer inventory 170, if there are any such classifications, is removed from further consideration, for example, by deleting that classification from the set S at step 240, or by doing nothing further with that classification. Likewise, any classification for which the specified safety stock is "0" can be removed from further consideration. In this manner, the web server 80 narrows the number of possible classifications into which the OSA under investigation ($OSA_n$) may be placed, and the OSA is not considered for classifications for which the safety stock requirements have already been satisfied.

Continuing, at step 250 the web server 80 references the restock-priority of each of the remaining classifications in the set $S_n$ and identifies the classification in the set having the highest priority, i.e., the OSA classification that is most difficult to form or which occurs less frequently in the OSA manufacturing process. That classification can then be finally assigned to the present $OSA_n$ under investigation. In this manner, the classification having the highest restock-priority for which the safety stock requirements have not already been satisfied will be assigned to that OSA. Thus, not only are inventory replenishing requirements satisfied, but predetermined prioritization criteria are satisfied. The resulting final classification of the OSAs efficiently and effectively satisfies multiple classification criteria which better ensures that a manufacturing process will have available in the inventory 170 the requisite OSAs.

Preferably, none of the OSA classifications have the same restock-priority. In this preferred arrangement, there will be no ties in priority among two classifications. However, if a common assignment of priority level is desired, a secondary selection process can be utilized when two or more classifications in the set $S_n$ have overlapping (i.e., the same) restock-priority, such as a random selection or a selection with reference to existing orders or demand for product. An arrangement which permits such a conflict resolution is described in the aforementioned patent application for DYNAMIC CONTROL OF OPTICAL SUBASSEMBLIES SELECTION FROM BUFFER INVENTORY.

At step 260, the web server 80 determines whether all of the OSAs in the present waffle pack have been marked with a final classification. If not, at step 265, the process flow loops to step 210 and repeats the process flow from steps 210 through 260 for each of the OSAs in the waffle pack. On the other hand, if the web server determines that all of the OSAs in the present waffle pack 130 have been assigned a final classification, then the contents of the waffle pack 130 are ready for sorting into respective homogeneous waffle packs 150 by the sorter 140, at step 270.

It should be understood that the foregoing process steps 200–270 can proceed by indexing from one OSA to the next within a single pack with the assignment of final classifications at step 250 being made as each OSA is examined, as described above, or after examination of all of the OSAs in a single waffle pack, or after examination of the OSAs in plural waffle packs.

In a modified arrangement of the preferred embodiment, a user may further specify a present demand for OSAs corresponding to a specific classification, for example, by requesting a specific quantity of a particular device type, as described in the aforementioned patent application.

Similarly, the demand can be entered by the inventory specialist at the user terminal 90. In this modified arrangement, once the set of qualifying classifications S has been determined at step 210, any present demand for the classifications included in the set S can be utilized in the process of making a final classification for a given OSA, for example, by comparing the present demand for OSAs of a classification which is included in the set S at step 280. The comparison at step 280 includes referencing the inventory database 180 to verify whether the demand can be met by the buffer inventory 170. If there are not enough OSAs of a particular classification for which there is a present demand, and if the $OSA_n$ under investigation includes such an in-demand classification in its set S, then that OSA can be assigned a final classification which is in-demand by jumping to step 250, and, more preferably, for the in-demand classification which has the highest priority. This jump bypasses the ordinary process of assigning a final classification in view of the safety stock requirements and restock-priority assignments in favor of a process flow which takes into account a present demand for product. On the other hand, if there is a sufficient number of OSAs in the buffer inventory 170 to meet the present demand, the process resumes at steps 220 or 230, as described above. In this modified arrangement, the inventory levels are better controlled to account for present demand for product, while maintaining the safety stock to satisfy future or projected demand.

Figure 3:
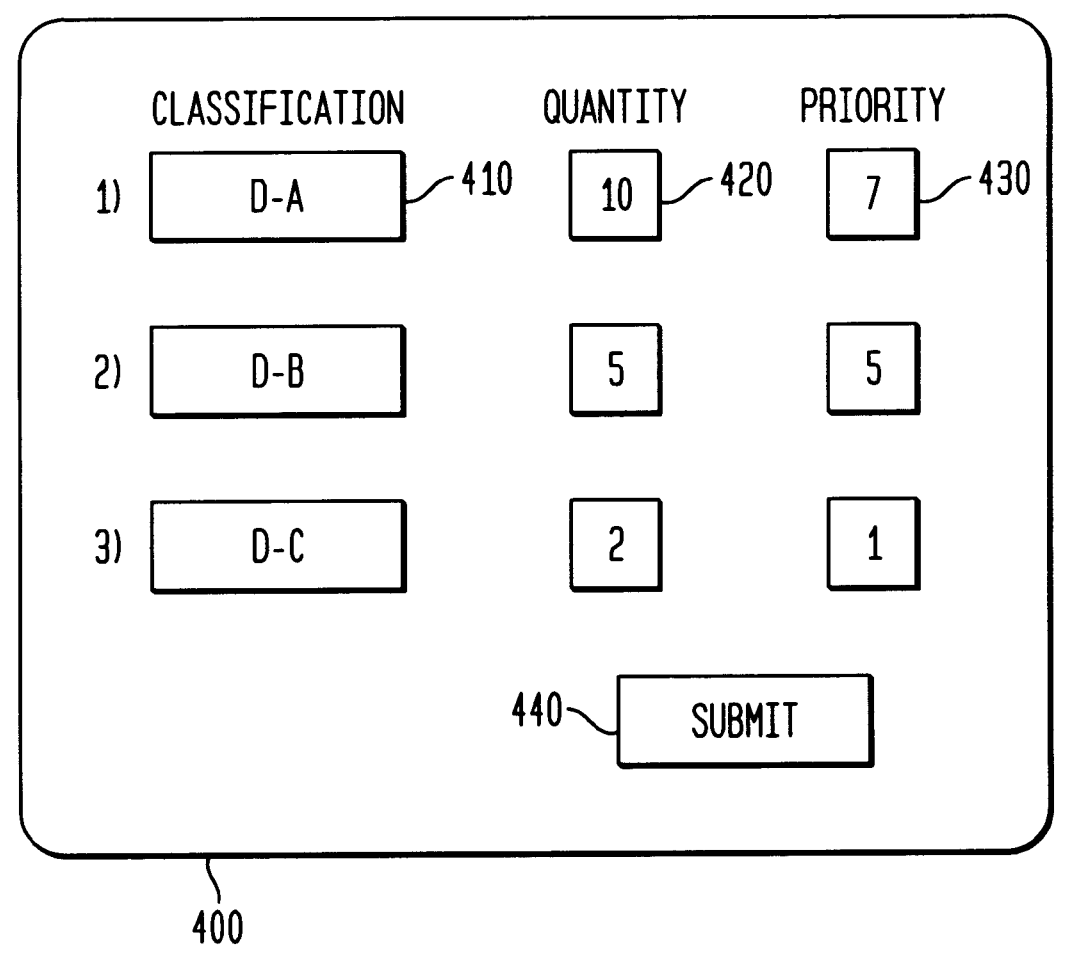

An example of the present invention is illustrated in FIGS. 3–5. FIG. 3 represents a form 400 for completion by an inventory specialist at the terminal 90. The form requests that the inventory specialist enter into box 410 an OSA classification which will be needed by a manufacturing process in order to produce an opto-electronic device. Alternatively, the specialist can input a device by name or code and the computer can determine the appropriate classification. The form 400 includes a box 420 for the safety stock number for that OSA classification and a box 430 for the restock-priority assigned to that classification. The completed form 400 is forwarded to the web server 80 using a submit button 440. The safety stock number reflects projected or future demand, which is derived from any of the numerous inventory and/or statistical sampling techniques known in the art, a default value which can be automatically entered into the box 420, an entry by the inventory specialist, or a default value overridden by the inventory specialist. The restock-priority assignment reflects the difficulty of producing an OSA of a particular classification. Thus, for example, if it is known that an OSA with particular parameters that can fit a certain classification rarely occurs as a result of the OSA manufacturing process, then that classification can be accorded a higher restock-priority than an OSA classification which references parameters that occur more frequently in the OSA manufacturing process. The restock-priority assignment may be dynamic, and be automatically adjusted by the system 100 in response to relative changes in yield data of one classification relative to the others, for example.

In the example of FIGS. 3–5, the inventory specialist enters for classification D-A a safety stock number 10 and a restock-priority "7", for classification D-B a safety stock number 5 and a restock-priority "5," and for classification D-C a safety stock number 2 and a restock-priority "1." For purposes of discussion only, "D-" denotes devices are in the digital family of optical subassemblies which are used to construct digital opto-electronic subassemblies. As noted above, the higher the restock-priority, the lower the assigned number.

FIG. 4 represents the OSA buffer inventory at various points in time in the sorting process that is performed by the sorter 140 under control of the web server 80 in accordance with the present invention. FIG. 4(*a*) represents the state of the physical buffer inventory 170 at the beginning of the sorting process. The buffer inventory contains 8 OSAs of classification D-A, 4 OSAs of classification D-B and no OSAs of classification D-C. The representation of the state of the buffer inventory, as represented in FIG. 4, is maintained in the inventory database 180.

FIG. 5 represents the first four OSAs ($OSA_1$, $OSA_2$, $OSA_3$, $OSA_4$) supported within a particular waffle pack 130 which has been tested and classified by the testing stations 110 and is within the sorter 140. In this example, $OSA_1$ fits classifications D-A and D-C; $OSA_2$ fits classifications D-A and B; and $OSA_3$ and $OSA_4$ both qualify under classifications D-A, D-B and D-C. This information is stored in the testing station database 120.

With reference again to FIG. 2, the four OSAs in the waffle pack of FIG. 5 are assigned a final classification with reference to the exemplary safety stock numbers and priorities assigned in FIG. 3 and the exemplary inventory status of FIG. 4. At step 200, $OSA_{1-4}$ are received by the sorter 140. Starting with $OSA_1$, the web server 80 references the database 120 at step 210 and learns that $OSA_1$ has been preclassified as qualifying for OSA classifications D-A and D-C. At steps 220, the web server 80 then investigates the inventory status of classifications D-A and D-C, that is, it checks inventory database 180 to determine how many OSAs are in the buffer inventory 170. As shown in FIG. 4(*a*), the buffer inventory 170 currently stores 8 OSAs of classification D-A and zero OSAs of classification D-C. At step 230, the safety stock number is referenced for each of these classifications, and, at step 240, a determination is made that neither classification can be eliminated from further consideration because the current inventory of both classification types is below their respective, specified safety stock levels. Specifically, the inventory of eight D-As is less than the safety stock number 10 for that classification of OSA, and the inventory of zero D-Cs is less than the safety stock number 2 for that classification of OSA (see FIG. 3).

At step 250, the web server 80 assigns a final classification to $OSA_1$ using the highest restock-priority assignment, which in this example is classification D-C. The buffer inventory 170 as represented by the accompanying inventory database 180 is updated to reflect $OSA_1$ as the lasted addition to inventory, as represented pictorially in FIG. 4(*b*).

Figure 4A:
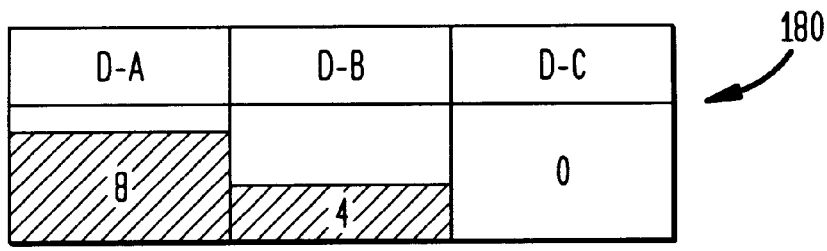
FIGS. 4(a)–4(d) are a schematic illustration of a portion of a database at various points in time, the database including information used in the system and method of the invention as shown in FIGS. 1 and 2.
Figure 4B:
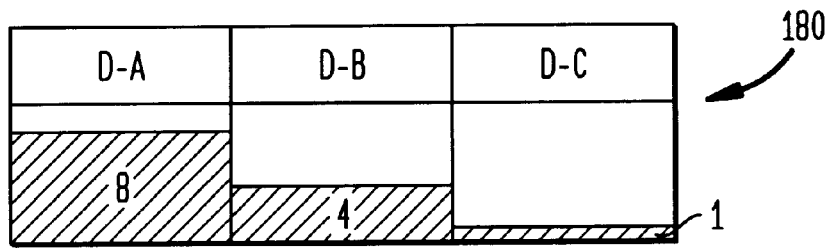
Figure 4C:
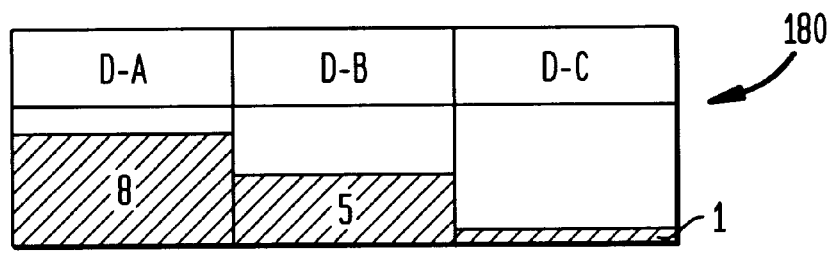

Continuing, the process determines that there are further OSAs on the present waffle pack (namely, $OSA_2$ $OSA_3$, and $OSA_4$) which have yet to be assigned a final classification. The process returns to step 210 and thereafter repeats for $OSA_2$, $OSA_3$, and $OSA_4$. With respect to $OSA_2$, reference to the database 120 shows that $OSA_2$, qualifies for classifications D-A and D-B, as shown in FIG. 5. The inventory database 180 shows in FIG. 4(*b*) that the buffer inventory 170 physically contains 8 OSAs of classification D-A and 4 OSAs of classification D-B. Neither of these classifications can be eliminated from further consideration since both classifications are below their safety stock numbers of 8 and 5, respectively (as indicated in FIG. 3). With reference to the priorities for each of these classifications, $OSA_2$ is assigned to classification D-B because, as shown in FIG. 3, classification D-B having a restock-priority "5" has a higher restock-priority than D-A, which has a restock-priority "7." The buffer inventory 170, as represented by the accompanying inventory database 180, is updated to reflect the fact that $OSA_2$, is being added to classification D-B, as represented in FIG. 4(c). At this stage, classification D-B has reached its safety stock quantity of 5 (see FIG. 3). Once again, there remain additional OSAs on the present waffle pack, as determined at step 260, so the process repeats.

Figure 4D:
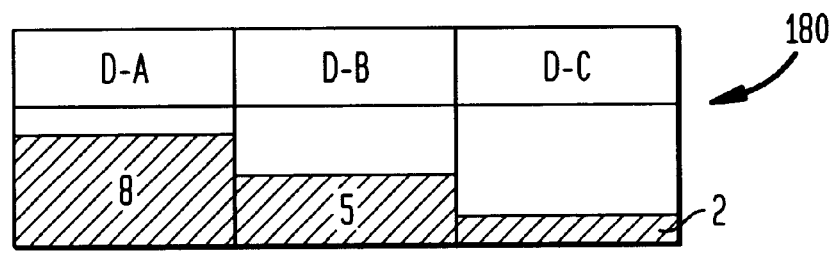

The parameters of $OSA_3$ cause it to qualify for OSA classifications D-A, D-B and D-C, as indicated in the database 120 (FIG. 5). The inventory buffer 170 status is examined with respect to each of those classifications, which at this stage, is represented in FIG. 4(c). As shown in FIG. 4(c), the buffer inventory 170 currently stores (or will store after the present waffle pack is sorted) 8 OSAs of classification D-A, 5 OSAs of classification D-B and 1 OSA of classification D-C. The web server 80 finds that classification D-B in the buffer inventory is currently at its safety stock level. Accordingly, the web server 80 at step 240 eliminates classification D-B as a potential final classification to which $OSA_3$ can be assigned. Proceeding to step 250, the web server 80 references the priorities of the remaining classifications (D-A and D-C) to determine the final classification assignment for $OSA_3$. As between classifications D-A and D-C, $OSA_3$ is assigned a final classification D-C because it has a higher restock-priority, as shown in FIG. 4(d). At this stage, both classifications D-C and D-B are at their respective, defined safety stock level.

The remaining OSA, $OSA_4$, is handled in the same manner. The $OSA_4$ parameters qualify for classifications D-A, D-B and D-C. Classifications D-B and D-C are currently at their safety stock levels. Accordingly, these qualifying classifications for $OSA_4$ are eliminated, and, by default, $OSA_4$ is assigned a final classification of D-A.

If in the prior example an order for a particular product were entered, the present demand effect of that order can be accounted for in the modified arrangement of the system and method of the present invention, discussed above. For example, if an order for 20 optical semiconductor devices, 10 of OSA classification D-B and 10 of OSA classification D-C were entered between the processing of $OSA_3$ and $OSA_4$ of waffle pack 130, then the buffer inventory 180 would appear as in FIG. 4(d). At step 220, the web server 80 determines, in this example, that the buffer inventory 170 contains the required safety stock level for classifications D-B and D-C included in the requested product (namely, 5 and 2, respectively), but does not satisfy the present demand for OSAs (10 each). Therefore, the test at step 280 causes the process to skip immediately to step 250 where any matching OSAs will be assigned classification D-B or D-C because inventory cannot meet present demand. As between classifications D-B and D-C, D-C has a higher restock-priority, and so $OSA_4$ is assigned a final classification of D-C, bringing the inventory level of D-C to 3 (not shown).

It should be understood that if present demand data were not considered at step 280, $OSA_4$ would have been assigned a final classification D-A because the safety stock levels for D-B and D-C have already been satisfied. Thus, incorporating orders for immediate demand allows an inventory manager to efficiently satisfy both current and future demand constraints on the final classification of OSAs.

The sorting procedure illustrated in FIG. 2 may be programmed to run on the web server 80 or any other logical processor connected to the network. The method of programming the web server 80 to process the sorting procedure as well as the programming required to present and accept the above-referenced information related to customer orders for opto-electronic devices as illustrated in FIG. 3 utilizes any of the common programming methods and server/Internet programming languages known in the art, such as C++, HTML, Java, etc. The programmer is not restricted to any particular programming technique or programming language provided the above-described functionality is achieved.

Although preferred embodiments have been disclosed for illustrative purposes, those skilled in the art will appreciate that many additions, modifications and substitutions are possible without departing from the scope and spirit of the invention as defined by the accompanying claims.

What is claimed is:

1. In a programmed machine, a method for assigning a final classification to a device having parameters which satisfy a set of qualifying classifications, comprising the steps of:
   obtaining an inventory count for each classification of device which corresponds to a qualifying classification in the set;
   comparing the obtained inventory count to a predetermined criterion; and
   assigning the final classification to the device from among the classifications which have an inventory count less than the predetermined criterion.

2. The method as in claim 1, wherein the predetermined criterion is a safety stock number.

3. The method as in claim 2, including the additional step of updating the inventory count of the classification to which the device is assigned.

4. The method as in claim 2, wherein each classification has an assigned restock-priority level and wherein the assigning step further includes assigning to the device the classification having the highest restock-priority.

5. The method as in claim 4, wherein each classification has an uniquely assigned restock-priority.

6. The method as in claim 5, including the additional step of updating the inventory count of the final classification to which the device is assigned.

7. The method as in claims 1, the predetermined criterion is a present demand.

8. The method as in claim 7, including the additional step of updating the inventory count of the final classification to which the device is assigned.

9. The method as in claim 7, wherein each classification has an assigned restock-priority level and wherein the assigning step further includes assigning to the device the classification having the highest restock-priority.

10. The method as in claim 9, wherein each classification has an uniquely assigned restock-priority.

11. The method as in claim 10, including the additional step of updating the inventory count of the final classification to which the device is assigned.

12. The method as in claim 9, wherein the assigning step further includes assigning to the device the classification having an inventory count which is less than a safety stock number.

13. In a programmed machine, a method for assigning a final classification to a device having parameters which satisfy a set of qualifying classifications, comprising the steps of:
   obtaining restock-priority assignment data associated with at least the classifications included in the set of qualifying classifications; and
   automatically assigning the final classification to the device based on the restock-priority assignment data.

14. The method as in claim 13, wherein the final classification assigned to the device is the classification associated with the highest restock-priority assignment.

15. The method as in claim 13, wherein said restock-priority assignment data is changeable.

16. A system for assigning a final classification to a device having parameters which satisfy a set of qualifying classifications, comprising:

means for obtaining an inventory count for each classification of device included in the set of qualifying classifications;

means for comparing the obtained inventory count to a predetermined criterion; and means for assigning the final classification to the device from among the classifications which have an inventory count less than the predetermined criterion.

17. The system as in claim 16, wherein said obtaining means, said comparing means, and said assigning means are a programmed machine.

18. A system for assigning a final classification to a device having parameters which satisfy a set of qualifying classifications, comprising:

a database containing an inventory count for each classification of device included in the set of qualifying classifications; and a processor connected to the database which compares the inventory count to a predetermined criterion for each classification included in the set of qualifying classifications, the processor assigning the final classification to the device from among the classifications which have an inventory count less than the predetermined criterion and incrementing the count in the database for the assigned classification.

19. The system as in claim 18, wherein the predetermined criterion is a safety stock number.

20. The system as in claim 19, wherein each classification has an assigned restock-priority level and wherein processor assigns to the device the classification having the highest restock-priority.

21. The system as in claim 20, wherein each classification has an uniquely assigned restock-priority.

22. The system as in claims 18, the predetermined criterion is a present demand.

23. The system as in claim 22, wherein each classification has an assigned restock-priority level and wherein the processor assigns to the device the classification having the highest restock-priority.

24. The system as in claim 23, wherein each classification has an uniquely assigned restock-priority.

25. The system as in claim 23, wherein the processor assigns to the device the classification having an inventory count which is less than a safety stock number.

26. A system for assigning a final classification to a device having parameters which satisfy a set of qualifying classifications, comprising:

a database containing restock-priority assignment data associated with at least the classifications included in the set of qualifying classifications; and a processor in communication with the database which automatically assigns the final classification to the device based on the restock-priority assignment data.

27. The system as in claim 26, wherein the final classification assigned to the device is the classification associated with the highest restock-priority assignment.

28. The system as in claim 26, wherein said restock-priority assignment data is changeable.

\* \* \* \* \*